United States Patent Office 2,895,944
Patented July 21, 1959

2,895,944

NOVEL CONDENSATION PRODUCTS

Herman Francis Mark, Brooklyn, N.Y., assignor to Robert S. Aries, Stamford, Conn.

No Drawing. Application December 2, 1955
Serial No. 550,762

17 Claims. (Cl. 260—65)

The present invention relates to novel condensation products, processes for the preparation thereof, and intermediates in the course of their preparation. More particularly, the invention relates to novel fiber-forming high polymers containing a recurring bis-diazine or bis-azole nucleus, and to the processes whereby they may be prepared.

Heretofore there have been prepared various fiber-forming high polymers of differing chemical structures such as the linear superpolyamides, linear esters of terephthalic acid and glycols, linear polymers of acrylonitrile, and the like. Each of these materials has presented numerous difficulties with respect to commercial application because of the absence of affinity for the dyestuffs currently available. The problem had been overcome only after extensive experimentation to find new dyestuffs or by exhaustive trials of known dyestuffs to find those few which might be successfully utilized.

Accordingly, it is an object of the present invention to provide novel condensation products from readily available materials which might be converted into fibers, films and the like.

It is a further object of the present invention to provide novel condensation products of but slightly basic character which therefore exhibit a special affinity for acid dyestuffs.

Another object of the invention is to provide simple procedures whereby the novel condensation products and intermediates in the preparation thereof may be synthesized.

It has now been found that novel condensation products may be obtained by condensation of bis-carbonylic, i.e., di-oxo, compounds with tetraamino compounds whereby a recurring linear chain is obtained. Specifically, by combining a compound having two carbonyl groups, i.e., a dialdehyde, a diketone or a mono-aldehyde monoketone, with a tetraamine having two pairs of primary or secondary amine groups, the nitrogen atoms of each pair of amine groups being separated by two or three atoms, linear condensation products capable of forming fibers may be obtained. The novel condensation products are characterized by recurring azole or diazine nuclei which because of their basicity exhibit affinity for acid dyestuffs.

The condensation is preferably conducted in the presence of acidic or basic condensation catalysts in an inert solvent. Since water is a by-product of the reaction it is preferable that some positive measures be taken to eliminate the water and hasten the reaction, e.g., use of elevated temperatures or vacuum.

The condensation is equimolar since each carbonyl function reacts with two amine functions to form an azole or diazine ring. By employing at least two moles of one of the reactants for each mole of the other reactant monomeric intermediates may be obtained and isolated, which intermediates may be subsequently reacted with further portions of the other reactant to produce a linear polymer. By variations in the molar proportions of the reagents, the molecular weight of the condensation products may similarly be varied.

By way of illustration, the reaction between glyoxal and tetra-(amino-methyl)-methane proceeds as follows:

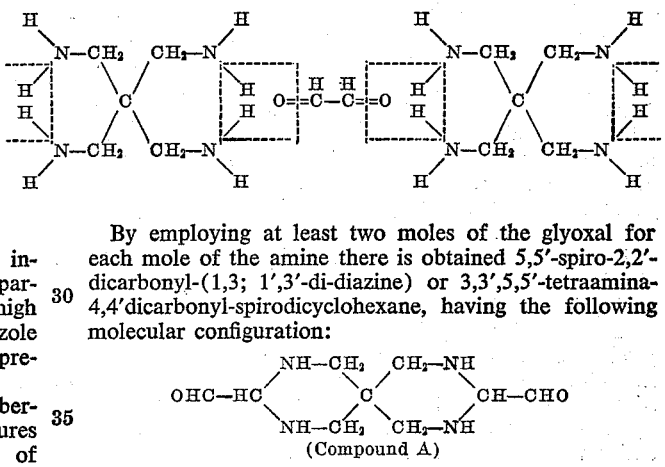

By employing at least two moles of the glyoxal for each mole of the amine there is obtained 5,5'-spiro-2,2'-dicarbonyl-(1,3; 1',3'-di-diazine) or 3,3',5,5'-tetraamina-4,4'dicarbonyl-spirodicyclohexane, having the following molecular configuration:

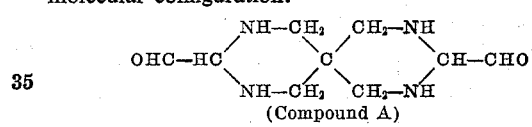

(Compound A)

This monomeric intermediate may be stored and subsequently condensed with additional amine to produce linear high polymers.

Similarly, at least two moles of the amine for each mole of glyoxal results in formation of an intermediate which may be further reacted with additional glyoxal to form the same linear polymers. The intermediate 5,5,5',5'-tetra-aminomethyl-(2,2'-di-diazinyl) has the following configuration:

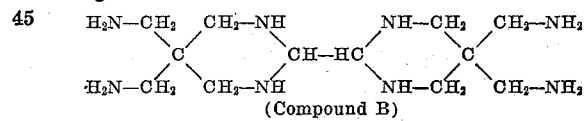

(Compound B)

As can be seen from these configurations the reaction proceeds through elimination of water between the oxygen atom of the carbonyl groups and one hydrogen atom from each of two adjacent amine groups. Because there are two carbonyl functions and two sets of two amine functions, i.e., a total of four amine functions, a linear polymer may be obtained.

In place of glyoxal other compounds containing two carbonyl groups may be employed. The dialdehydes of dicarboxylic acids are particularly suitable because of the relative ease with which they may be obtained by partial reduction of the carboxylic acids. Representative dialdehydes include those of dibasic acids such as malonic, succinic, glutaric, adipic, and the like. Diketones are similarly reactive and representative compounds include butene-dione-2,3, pentane-dione-2,4, pentane-dione-2,3, heptane-dione-2,5, and the like. Similarly, compounds containing one ketone group and one aldehyde group may be employed, such as 2-keto-propionaldehyde, 3-keto-heptanealdehyde, and the like.

In place of di-oxo-alkanes the dicarbonyl compounds may be substituted by alkyl, alkoxy, aryl, hydroxy, or other non-interfering radicals. Similarly the carbonyl groups may be separated by chains containing ether, aryl, or similar non-interfering linkages. Representative materials include 2-methoxy-succinaldehyde, terephthalic acid dialdehyde, 4-oxa-heptanedialdehyde, and osones or keto-derivatives of sugars such as 2-keto-glycerose, 2-keto-glucose, 3-keto-fructose, and the like.

Amine groups in order to be reactive in the manner indicated must contain a free hydrogen atom and therefore only primary or secondary amine functions are suitable. Tetra-(amino-methyl)-methane is preferred because of the ease with which it may be prepared from the readily available pentaerythritol. Since the condensation of the carbonyl group will proceed with two amino groups to produce a five or six membered ring under normal circumstances, the two amine functions making up each reactive set should be separated by either two or three atoms. The individual sets, each of which contains two reactive amine functions, may be considered as radicals of ethylene diamine or propylene diamine. These radicals are interconnected to form a single molecule containing four reactive amine groups. With tetra-(amino-methyl)-methane the interconnection takes the form of a common carbon atom shared by both sets so that the condensation products have a spiro configuration. With 1,1,2,2-tetraamino-ethane the condensation product will include two fused azole rings, i.e., the rings will share two carbon atoms. When using 2,2'-bis(1,3-diaminopropane) the two diazine rings present in the condensation product will share no atoms but will be directly connected as in diphenyl. When the ethylene diamine or propylene diamine radicals are separated by several atoms the resulting diazole or diazine rings will be similarly separated.

Amines which may be employed include substitution products of the tetraamine compounds hereinabove noted. In addition to tetra-amino alkanes, non-interfering substituents such as alkyl, alkoxy or simple aryl containing up to about seven atoms may be present either on the amine nitrogen or on the carbon chain.

The reaction between the carbonyl and amino compounds is generally effected at elevated temperatures ranging from about 50° C. to about 250° C. A temperature range of about 120° C. to about 160° C. is preferred, however. The simultaneous use of vacuum is also preferable since it hastens the elimination of water and protects the aldehyde or ketone functions against oxidation by air. If desired, the reaction may be effected under a cushion of inert gas such as nitrogen or carbon dioxide to further prevent oxidation, thereby permitting condensation products of higher molecular weight to be obtained.

Both acids and bases catalyze the reaction and are employed in an amount ranging from about 0.1 to about 1% of the combined weights of the reactants. Since the reaction is conducted at elevated temperatures and provision is made for escape of the by-product water, the catalyst when employed is preferably non-volatile. Mineral acids such as sulfuric or phosphoric acids may be employed as well as organic acids such as trichloroacetic acid, benzenesulfonic acid, and the like. However, oxalic acid is preferred since after completion of the reaction heating of the condensation product will decompose the oxalic acid into carbon dioxide, carbon monoxide and water which will volatilize at the elevated temperatures. Consequently, no further steps will be required to remove or neutralize the catalyst.

Suitable basic catalysts include caustic soda, barium hydroxide, or organic bases such as ethylenediamine, and the like. With respect to the method of catalysis, it is believed that the acid ties up with the strongly basic primary or secondary amine, which then reacts to form the comparatively weak heterocyclic amines; the acid then migrates to further strong amino groups. Bases unite with the carbonyl function to catalyze the reaction.

Solvent media which may be employed in the practice of the present invention include inert organic substances which are liquid under the reaction conditions. These include tetrahydrofurane, dimethyl formamide, tetramethylene cyclic sulfone, ethers such as dibutyl ether, ketones such as methylethyl ketone, esters such as ethyl acetate, propyl acetate, ethylene carbonate, and other inert media. Dioxane is a preferred solvent, however, since it is a solvent for the starting materials whereas the condensation products of high molecular weight precipitate therefrom. Where the reagents are fluid, however, the solvent may be dispensed with.

When the reagents are employed in substantially equimolar proportions condensation products having molecular weights ranging from about 15,000 to 25,000 may readily be prepared, i.e., a D.P. of about 100 to 160. When either of the reagents is present in twice the stoichiometric amount, potentially reactive intermediates will be obtained. Intermediate amounts of the reagents will produce condensation products of correspondingly decreased molecular weight. Upon attaining the desired molecular weight where it is desired to obtain products of shorter chain length than the theoretical limit, introduction of monofunctional aldehyde or amine will prevent continuation of the reaction. Alternatively, upon heating a product containing terminal aldehyde or ketone groups in the presence of air, these groups will be oxidized to preclude the possibility of further growth.

The following examples are illustrative of procedures whereby the novel intermediate and polymeric condensation products thereof may be obtained and employed:

*Example I*

(a) 13.2 grams of tetra-(amino-methyl)-methane (0.1 mole) are dissolved in 300 ml. of dioxane and the solution is heated under pressure to 120° C. in an oil bath. Then a solution of 5.8 grams glyoxal (0.1 mole) in 50 ml. dioxane containing 0.1 gram sulfuric acid is added under vigorous stirring. A white powder slowly forms and settles down to the bottom of the flask; it is filtered off and washed with alcohol and water. This material is insoluble in all conventional solvents and upon heating does not melt below 350° C. Above that temperature, it slowly decomposes with discoloration. Although no crystals are visible under a normal microscope, the material gives an X-ray pattern characteristic for crystalline polymers such as cellulose, the linear polyamides and polyesters. Because of its insolubility and infusibility, no practical application of this material has been attempted.

(b) 13.2 grams of tetra-(amino-methyl)-methane are reacted with 11.6 grams of glyoxal under the conditions of (a) to form a solution of 5,5'-spiro-2,2'-dicarbonyl-(1,3;1',3'-di-diziane) in dioxane. This compound when recovered from its solution is a white crystalline powder soluble in ethyl acetate and cyclohexanone as well as dioxane. By reaction with further quantities of tetra(amino-methyl)-methane there can be obtained the same polymeric product as in (a).

(c) 26.4 grams of tetra-(amino-methyl)-methane are reacted with 5.8 grams of glyoxal under the conditions of (a) to form 5,5,5',5'-tetra-aminomethyl-(2,2'-di-diazinyl) which is soluble in acid solutions. This compound upon reaction with glyoxal or with 5,5'-spiro-2,2'-dicarbonyl-(1,3; 1',3'-di-diazine) yields the same polymeric material as in (a). The novel intermediate can also be reacted with chloracetic acid to give an excellent chelating agent for iron and other polyvalent cations.

*Example II*

6.6 grams of tetra-(amino-methyl)-methane (.05 mole) are dissolved in 150 ml. of tetrahydrofuran and a solution of 3.6 grams succinic acid dialdehyde (.04 mole) in 50 ml. dioxane containing 0.2 gram phosphoric acid is added. Then the system is heated to 70° C. whereupon a white powder precipitates, and is filtered off, washed and dried. The product is a polymeric crystalline material melting at about 260° C. and soluble in liquids such as dimethylformamide, tetramethylene cyclic sulfone and ethylene carbonate.

Example III (a) 2 grams of the reaction product of Example 2 are dissolved in 20 grams of dimethylformamide, the solution having a viscosity at room temperature of about 5000 centipoises.

(b) The solution obtained in (a) is cast on a glass plate and the solvent is slowly evaporated. A colorless, transparent film is formed which adheres firmly to the glass support. Similar adhesion characteristics may be obtained with metal or wood supports. The film is characterized by its flexibility and toughness.

(c) The solution obtained in (a) is passed through a spinning nozzle into hot air to form a filament which is drawn and oriented. Filaments so produced have tenacities up to 5.5 grams/denier and elongations to break between 15% and 25%. The filaments accept acid dyestuffs with great ease.

Example IV 14.6 grams of 1,1,2,2-tetra-(amino-methyl)-ethane are dissolved in 25 ml. of tetramethylene cyclic sulfone, a solution of 8.8 grams of di-acetyl in 60 ml. dioxane containing 0.2 gram NaOH is added and the system heated to 100° C. A white powder precipitates out rapidly and settles to the bottom of the reaction vessel. After separation, washing and drying, it can be identified as an insoluble polymer which softens at about 325° C., and can be cast from the melt into colorless, transparent films, which are flexible and adhere firmly to polar supports.

Example V

To 13.2 grams of tetra-(amino-methyl)-methane in 300 ml. dibutyl ether there are added 0.3 gram of oxalic acid and 11.4 grams of adipic acid dialdehyde in 40 ml. dioxane and the mixture heated under pressure to 120° C. A polymer is produced which is soluble in esters and ketones. The softening point of the polymer is about 180° C. Films and fibers can be made from solutions of the polymer while melts of the polymer can be employed for spinning and injection molding.

Example VI 13.2 grams of tetra-(amino-methyl)-methane in 200 ml. of dioxane are reacted with a mixture of 2.8 grams adipic acid dialdehyde and 2.7 grams of terephthalic acid dialdehyde in 50 ml. dioxane in the presence of 0.1 gram sulfuric acid at 100° C. There is obtained a polymer melting at 250° C., which is soluble in high boiling solvents and which can be cast and spun.

Various changes and modifications may be made without departing from the spirit and scope of the present invention and it is intended that such obvious changes and modifications be embraced by the annexed claims.

What is claimed is:

1. A condensation product of a di-oxo-alkane and a tetra-amine comprising two pairs of amino groups wherein both amino nitrogen atoms of each pair are separated from both amino nitrogen atoms of the other pair by an aliphatic chain containing from 2 to 3 carbon atoms.

2. A condensation product of a di-oxo-alkane and a tetra-aminoalkane comprising two pairs of amino groups wherein both nitrogen atoms of each pair are separated from both amino nitrogen atoms of the other pair by an aliphatic carbon chain of 3 carbon atoms.

3. A condensation product according to claim 2, wherein said di-oxo-alkane is a dialdehyde.

4. A condensation product according to claim 2, wherein said di-oxo-alkane is a di-ketone.

5. A condensation product according to claim 2, wherein said di-oxo-alkane is a mono-ketone, mono-aldehyde.

6. A condensation product of a dialdehyde and tetra-(amino-methyl)-methane.

7. A condensation product of glyoxal and tetra-(amino-methyl)-methane.

8. The compound comprising the reaction product of at least 2 moles of glyoxal and 1 mole of tetra-amino-methyl)-methane and having the molecular configuration:

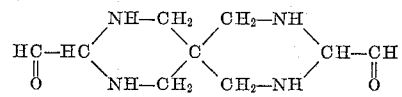

9. The compound comprising the reaction product of at least 2 moles of tetra-(amino-methyl)-methane and 1 mole of glyoxal and having the molecular configuration:

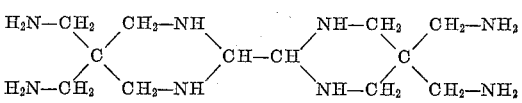

10. A fiber comprising a linear condensation product of glyoxal and tetra-(amino-methyl)-methane having a molecular weight in excess of about 15,000.

11. The process for preparing a novel condensation product which comprises heating at a temperature ranging from about 50° C. to about 250° C. a fluid mixture of a di-oxo-alkane and a tetra-amine comprising two pairs of amino groups wherein both amino nitrogen atoms of each pair are separated from both amino nitrogen atoms of the other pair by an aliphatic chain containing from 2 to 3 carbon atoms.

12. The process for preparing a novel condensation product which comprises heating at a temperature ranging from about 120° C. to about 160° C. a solution in an inert organic solvent of a mixture of a di-oxo-alkane and a tetra-aminoalkane comprising two pairs of amino groups wherein both amino nitrogen atoms of each pair are separated from both amino nitrogen atoms of the other pair by an aliphatic chain of 3 carbon atoms, the molar ratio of said di-oxo-alkane to said tetra-amine ranging from about ½:1 to 2:1.

13. The process for preparing a novel condensation product which comprises heating a fluid mixture of glyoxal and tetra-(amino-methyl)-methane.

14. The process for preparing a novel condensation product which comprises heating at a temperature ranging from about 50° C. to about 250° C. a solution in an inert organic solvent of glyoxal, from about ½ to 2 times the molar amount of tetra-(amino-methyl)-methane, and about .1 to about 1% by weight based on the combined weight of said reagents of an acid as catalyst.

15. The process for preparing a novel condensation product which comprises heating at a temperature ranging from about 120° C. to about 160° C. a solution in dioxane of a substantially equimolar mixture of glyoxal and tetra-(amino-methyl)-methane, in the presence of about .1 to about 1% by weight based on the combined weight of said reagents of oxalic acid as catalyst.

16. The process defined in claim 12, wherein the solution contains an acid as condensation catalyst, the catalyst being present in an amount ranging from about .1 to 1% of the combined weights of the di-oxo-alkane and tetra-amino alkane.

17. The process defined in claim 12, wherein the solution contains a strong inorganic alkali as condensation catalyst, the catalyst being present in an amount ranging from about .1 to 1% of the combined weights of the di-oxo-alkane and tetra-amino alkane.

References Cited in the file of this patent

FOREIGN PATENTS 474,601    Great Britain _____ Nov. 1, 1937